(12) United States Patent
Pederson

(10) Patent No.: US 7,059,382 B2
(45) Date of Patent: Jun. 13, 2006

(54) METHOD OF INCORPORATING BROMINATED COMPOUNDS AS ADDITIVES TO EXPANDED POLYSTYRENE MOLDED PATTERNS FOR USE IN LOST FOAM ALUMINUM CASTING

(75) Inventor: Thomas C. Pederson, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 315 days.

(21) Appl. No.: 10/646,516

(22) Filed: Aug. 21, 2003

(65) Prior Publication Data

US 2005/0043464 A1    Feb. 24, 2005

(51) Int. Cl.
   *B22C 7/02*     (2006.01)
(52) U.S. Cl. .......................................... 164/34; 164/45
(58) Field of Classification Search .................. 164/34, 164/45
   See application file for complete search history.

(56) References Cited

U.S. PATENT DOCUMENTS

| 4,286,071 A | * | 8/1981 | Rigler et al. | ................... 521/96 |
| 6,303,664 B1 | * | 10/2001 | Sonnenberg et al. | .......... 521/56 |
| 6,710,094 B1 | * | 3/2004 | Sonnenberg | ................. 521/56 |

* cited by examiner

*Primary Examiner*—Kevin P. Kerns
(74) *Attorney, Agent, or Firm*—Cary W. Brooks

(57) ABSTRACT

A process including topically applying a finely divided powder onto a plurality of polystyrene beads. The finely divided powder includes brominated compounds including a brominated alkane having at least one substituent aromatic group. The polystyrene beads are pre-expanded with the topically applied brominated compounds and a molded pattern is formed from the pre-expanded polystyrene beads. A lost foam casting mold is formed with the molded pattern. Molten metal is poured into the lost foam casting mold and onto the molded pattern to depolymerize the polystyrene beads with the topically applied brominated compounds.

15 Claims, 4 Drawing Sheets

TBCO
tetrabromocyclooctane

HBCD
hexabromocyclododecane

DBDE
dibromodiphenylethane

TBDB
tetrabromodiphenylbutane

HBDH
hexabromodiphenylhexane

METHOD OF INCORPORATING BROMINATED COMPOUNDS AS ADDITIVES TO EXPANDED POLYSTYRENE MOLDED PATTERNS FOR USE IN LOST FOAM ALUMINUM CASTING

FIELD OF THE INVENTION

This invention relates to preparing polystyrene molded patterns, and more particularly to a method of incorporating brominated compounds as additives to expanded polystyrene molded patterns for use in lost foam aluminum casting.

BACKGROUND OF THE INVENTION

Brominated compounds are commonly included as additives in expandable polystyrene for the purpose of reducing the flammability of the product material. Numerous patents exist describing ways to integrated these additives into polystyrene beads used to mold shaped objects. The flame suppression involves both accelerated polymer shrinkage from an advancing flame front and the ability of liberated bromine atoms to quench the oxidative chemistry of the flame. Brominated flame retardants are extensively used in polystyrene products intended for use in building construction or packaging. On the other hand, these additives are prohibited in polystyrene products used as food or beverage containers. Consequently, the presence or absence of brominated compounds in polystyrene beads used by foundries for lost foam casting has depended, inadvertently, on whether the selected suppliers serves the construction/packaging or food/beverage industries.

Commercially available expanded polystyrene beads contain integrated bromocompounds (intended to serve as flame retardants) have been used for lost foam casting of aluminum. This has occurred primarily in Europe where beads containing hexabromocyclododecane (HBCD) (FIG. 1) or tetrabromocyclooctane (TBCO) (FIG. 2) have been produced by German chemical manufacturers. It has been discovered (by applicants) that commercially available expanded polymer containing integrated bromocompounds have produced significantly fewer fold defects in engine castings. However, expanded polystyrene beads with these integrated bromocompounds require an additional lubricant additive for use in lost foam castings. Polystyrene beads with the integrated bromocompounds are also expensive. Furthermore, these commercially available beads with integrated HCBD or TBCO can be environmentally undesirable because the bromine atom is located on the aromatic ring. Thus it would be desirable to provide a method of inexpensively producing environmentally acceptable expanded polystyrene beads for use in making mold shaped objects for lost foam aluminum casting.

SUMMARY OF THE INVENTION

One embodiment of the invention includes a process comprising topically applying brominated compounds onto a plurality of polystyrene beads, the brominated compounds comprising a brominated alkane having at least one substituent aromatic group; and forming a molded pattern from the polystyrene beads with the topically applied brominated compounds.

Another embodiment of the invention includes forming a molded pattern from the polystyrene beads with the topically applied brominated compounds wherein one of the substituent aromatic group comprises a phenyl group.

Another embodiment of the invention includes forming a molded pattern from the polystyrene beads with the topically applied brominated compounds wherein the brominated compounds include two substituent aromatic groups.

Another embodiment of the invention includes forming a molded pattern from the polystyrene beads with the topically applied brominated compounds wherein each of the two substituent aromatic groups comprises a phenyl group.

Another embodiment of the invention includes forming a molded pattern from the polystyrene beads with the topically applied brominated compounds wherein the brominated compounds include three substituent aromatic groups.

Another embodiment of the invention includes forming a molded pattern from the polystyrene beads with the topically applied brominated compounds wherein each of the three substituent aromatic groups comprises a phenyl group.

Another embodiment of the invention includes forming a molded pattern from the polystyrene beads with the topically applied brominated compounds wherein each of the brominated compounds comprises at least two bromine substituents.

Another embodiment of the invention includes forming a molded pattern from the polystyrene beads with the topically applied brominated compounds wherein each of the brominated compounds comprises at least four bromine substituents.

Another embodiment of the invention includes forming a molded pattern from the polystyrene beads with the topically applied brominated compounds wherein the brominated compounds are topically applied to the polystyrene beads in an amount ranging from 0.1–5 weight percent.

Another embodiment of the invention includes forming a molded pattern from the polystyrene beads with the topically applied brominated compounds wherein the brominated compounds are topically applied to the polystyrene beads in an amount ranging from 0.1–2 weight percent.

Another embodiment of the invention includes forming a molded pattern from the polystyrene beads with the topically applied brominated compounds wherein the brominated compounds comprise dibromodiphenylethane.

Another embodiment of the invention includes forming a molded pattern from the polystyrene beads with the topically applied brominated compounds wherein the brominated compounds comprise 1,2-dibromo-1,2-diphenylethane.

Another embodiment of the invention includes forming a molded pattern from the polystyrene beads with the topically applied brominated compounds wherein the brominated compounds comprise tetrabromodiphenylbutane.

Another embodiment of the invention includes forming a molded pattern from the polystyrene beads with the topically applied brominated compounds wherein the brominated compounds comprise 1,2,3,4-tetrabromo-1,2-diphenylbutane.

Another embodiment of the invention includes forming a molded pattern from the polystyrene beads with the topically applied brominated compounds wherein the brominated compounds comprise hexabromodiphenylhexane.

Another embodiment of the invention includes forming a molded pattern from the polystyrene beads with the topically applied brominated compounds wherein the brominated compounds comprise 1,2,3,4,5,6-hexabromo-1,2-diphenylhexane.

Another embodiment of the invention includes forming a molded pattern from the polystyrene beads with the topically applied brominated compounds further comprising forming a lost foam casting mold from the molded pattern and pouring molten metal onto the molded pattern causing the polystyrene beads to depolymerize.

Another embodiment of the invention includes forming a molded pattern from the polystyrene beads with the topically applied brominated compounds further comprising pre-expanding the polystyrene beads prior to forming the molded pattern.

Another embodiment of the invention includes forming a molded pattern from the polystyrene beads with the topically applied brominated compounds wherein the brominated compounds comprise a finely divided powder.

Another embodiment of the invention includes forming a molded pattern from the polystyrene beads with the topically applied brominated compounds wherein the brominated compounds are topically applied by mechanically mixing the finely divided powder and beads together.

Another embodiment of the invention includes a process comprising: topically applying a finely divided powder onto a plurality of polystyrene beads, the finely divided powder comprising brominated compounds including a brominated alkane having at least one substituent aromatic group; pre-expanding the polystyrene beads with the topically applied brominated compounds and forming a molded pattern from the pre-expanded polystyrene beads; forming a lost foam casting mold with the molded pattern; and pouring molten metal into the lost foam casting mold and onto the molded pattern to depolymerize the polystyrene beads with the topically applied brominated compounds.

Another embodiment of the invention includes pouring molten metal into the lost foam casting mold and onto the molded pattern to depolymerize the polystyrene beads with the topically applied brominated compounds wherein one of the substituent aromatic group comprises a phenyl group.

Another embodiment of the invention includes pouring molten metal into the lost foam casting mold and onto the molded pattern to depolymerize the polystyrene beads with the topically applied brominated compounds wherein the brominated compounds include two substituent aromatic groups.

Another embodiment of the invention includes pouring molten metal into the lost foam casting mold and onto the molded pattern to depolymerize the polystyrene beads with the topically applied brominated compounds wherein each of the two substituent aromatic groups comprises a phenyl group.

Another embodiment of the invention includes pouring molten metal into the lost foam casting mold and onto the molded pattern to depolymerize the polystyrene beads with the topically applied brominated compounds wherein the brominated compounds include three substituent aromatic groups.

Another embodiment of the invention includes pouring molten metal into the lost foam casting mold and onto the molded pattern to depolymerize the polystyrene beads with the topically applied brominated compounds wherein each of the three substituent aromatic groups comprises a phenyl group.

Another embodiment of the invention includes pouring molten metal into the lost foam casting mold and onto the molded pattern to depolymerize the polystyrene beads with the topically applied brominated compounds wherein each of the brominated compounds comprises at least two bromine substituents.

Another embodiment of the invention includes pouring molten metal into the lost foam casting mold and onto the molded pattern to depolymerize the polystyrene beads with the topically applied brominated compounds wherein each of the brominated compounds comprises at least four bromine substituents.

Another embodiment of the invention includes pouring molten metal into the lost foam casting mold and onto the molded pattern to depolymerize the polystyrene beads with the topically applied brominated compounds wherein the brominated compounds are topically applied to the polystyrene beads in an amount ranging from 0.1–5 weight percent.

Another embodiment of the invention includes pouring molten metal into the lost foam casting mold and onto the molded pattern to depolymerize the polystyrene beads with the topically applied brominated compounds wherein the brominated compounds are topically applied to the polystyrene beads in an amount ranging from 0.1–2 weight percent.

Another embodiment of the invention includes pouring molten metal into the lost foam casting mold and onto the molded pattern to depolymerize the polystyrene beads with the topically applied brominated compounds wherein the brominated compounds comprise dibromodiphenylethane.

Another embodiment of the invention includes pouring molten metal into the lost foam casting mold and onto the molded pattern to depolymerize the polystyrene beads with the topically applied brominated compounds wherein the brominated compounds comprise 1,2-dibromo-1,2-diphenylethane.

Another embodiment of the invention includes pouring molten metal into the lost foam casting mold and onto the molded pattern to depolymerize the polystyrene beads with the topically applied brominated compounds wherein the brominated compounds comprise tetrabromodiphenylbutane.

Another embodiment of the invention includes pouring molten metal into the lost foam casting mold and onto the molded pattern to depolymerize the polystyrene beads with the topically applied brominated compounds wherein the brominated compounds comprise 1,2,3,4-tetrabromo-1,2-diphenylbutane.

Another embodiment of the invention includes pouring molten metal into the lost foam casting mold and onto the molded pattern to depolymerize the polystyrene beads with the topically applied brominated compounds wherein the brominated compounds comprise hexabromodiphenylhexane.

Another embodiment of the invention includes pouring molten metal into the lost foam casting mold and onto the molded pattern to depolymerize the polystyrene beads with the topically applied brominated compounds wherein the brominated compounds comprise 1,2,3,4,5,6-hexabromo-1,2-diphenylhexane.

Another embodiment of the invention includes a process comprising topically applying brominated compounds to a plurality of polymer beads, the brominated compounds comprising a carbon chain having at least one bromine substituent, and having at least substituent one aromatic group; and forming a molded pattern from the polymer beads with the topically applied brominated compounds.

Another embodiment of the invention includes a process comprising topically applying brominated compounds to a plurality of polymer beads and further comprising forming a lost foam casting mold from the molded pattern and pouring molten metal into the molded pattern causing the polymer beads to depolymerize.

Another embodiment of the invention includes a process comprising: topically applying brominated compounds to a plurality of polymer beads and pouring molten metal onto the beads wherein the molten metal comprises aluminum.

Another embodiment of the invention includes a process comprising topically applying brominated compounds to a plurality of polymer beads wherein at least one of the aromatic groups comprises a phenyl group.

Another embodiment of the invention includes a process comprising topically applying brominated compounds to a plurality of polymer beads wherein the polymer beads comprise polystyrene beads.

Another embodiment of the invention includes a process comprising topically applying brominated compounds to a plurality of polymer beads wherein the brominated compounds are selected from the group consisting of dibromodiphenylethane, tetrabromodiphenylbutane, hexabromodiphenylhexane and mixtures thereof.

Another embodiment of the invention includes a process comprising topically applying brominated compounds to a plurality of polymer beads wherein the brominated compounds comprise dibromodiphenylethane.

Another embodiment of the invention includes a process comprising topically applying brominated compounds to a plurality of polymer beads wherein the brominated compounds comprise tetrabromodiphenylbutane.

Another embodiment of the invention includes a process comprising topically applying brominated compounds to a plurality of polymer beads wherein the brominated compounds comprise hexabromodiphenylhexane.

Another embodiment of the invention includes a process comprising topically applying brominated compounds to a plurality of polymer beads wherein the forming of the molded pattern is accomplished without the use of additional lubricants.

Another embodiment of the invention includes a process comprising topically applying brominated compounds to a plurality of polymer beads wherein the forming of the molded pattern is accomplished without a stearate lubricant.

Another embodiment of the invention includes a process comprising: topically applying brominated compounds to a plurality of polymer beads wherein the bromocompounds do not have an aromatic group with a substituent bromine on the aromatic group.

Another embodiment of the invention includes a process comprising topically applying brominated compounds to a plurality of polymer beads wherein the bromocompounds comprise a finely divided powder.

Another embodiment of the invention includes a process comprising topically applying brominated compounds to a plurality of polymer beads wherein the bromocompounds are topically applied to the beads by pouring the finely divided powder onto the beads in mechanically mixing the beads and powder together.

Another embodiment of the invention includes a process comprising topically applying a finely divided powder to a plurality of polymer beads, the finely divided powder comprising brominated compounds including a carbon chain having at least one bromine substituent, and having at least one aromatic group substituent.

These another objects, features and advantages of the present invention will become apparent from the following brief description of the drawings, detailed description of the preferred embodiments, and appended claims and drawings.

DETAILED DESCRIPTION OF THE PREFERRED EMBODIMENTS

The invention includes the process for the incorporating (topical application) of brominated compounds, as additives, to polystyrene beads to make expanded polystyrene molded patterns for use in lost foam aluminum castings. The brominated compounds are used as additives to reduce or eliminate a type of casting defect attributed to polystyrene degradation products becoming entrapped in the solidifying aluminum immediately following displacement of the expanded polystyrene pattern by the advancing metal front in lost foam aluminum casting. The effect of brominated additives is attributed to accelerated depolymerization of the polystyrene, initiated by the liberalization of bromine radicals, which reduces the viscosity of the liquid polystyrene products.

The use of topically applied brominated compounds is applicable to all types of expanded polystyrene beads as classified by bead size and molecular weight. The brominated compounds are added as a finely divided powder to the unexpanded polystyrene beads using mechanical mixing in a manner similar to that used for adding other lubricant, such as stearates, to polystyrene beads with integrated bromocompounds. The particle size range of the finely divided powder is sufficient to avoid clumping of the powder during the mechanical mixing process, and is sufficient to results in the rapid depolymerization of the beads in order to avoid casting defects associated with pieces of the molded pattern becoming entrapped in the molten metal. The brominated compounds are added to the unexpanded polystyrene beads in an amount ranging from 0.1–5 weight percent, and preferably 0.1–2 percent by total weight. After the brominated compounds have been topically applied to the surface of the unexpanded beads, the beads can be pre-expanded and molded by conventional means.

Figure 1:
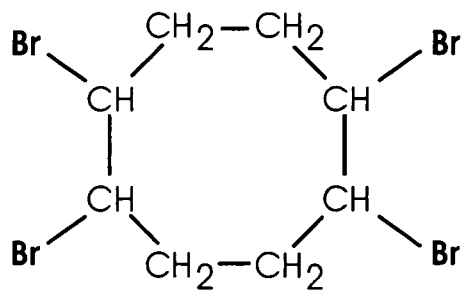
FIG. 1 is an illustration of a prior art compound known as the tetrabromocyclooctane.
Figure 2:
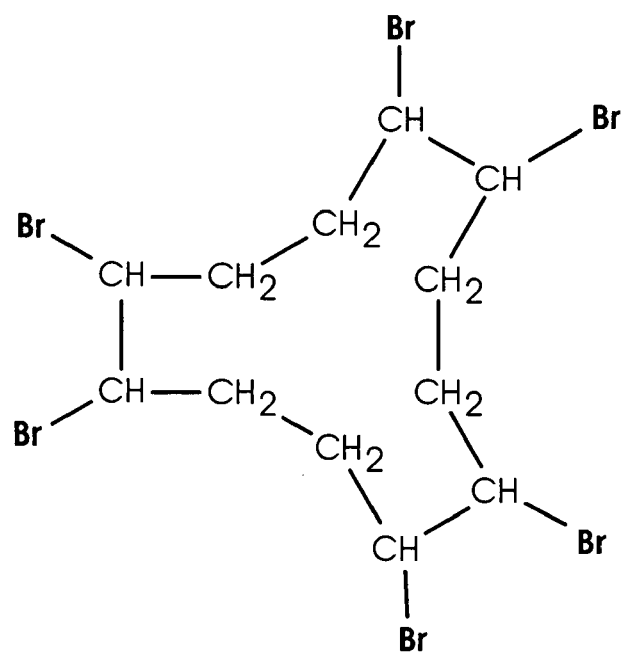
FIG. 2 is illustration of a prior art compound known as hexabromocyclododecane.
Figure 3:
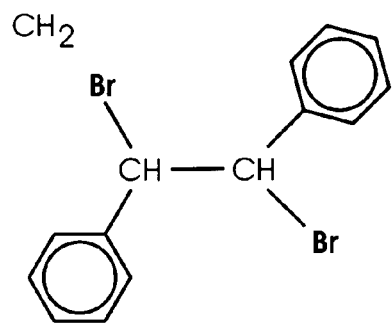
FIG. 3 is an illustration of a compound known as dibromodiphenylethane useful in the present invention.
Figure 4:
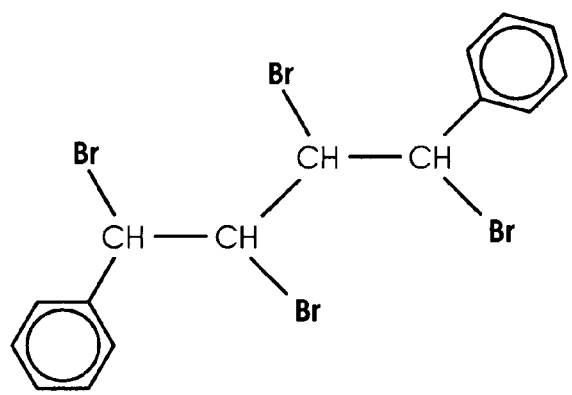
FIG. 4 is an illustration of a compound known as tetrabromodiphenylbutane useful in the present invention.
Figure 5:
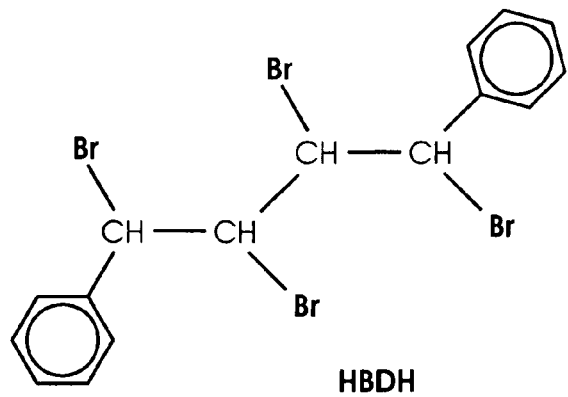
FIG. 5 is an illustration of a compound known as hexabromodiphenylhexane useful in the present invention.

The brominated compounds are preferably brominated alkanes with additional aromatic, preferably phenyl, substituents. There may be multiple bromine atoms on the alkane chain and there may be one, two or more aromatic groups substituted on the carbon chain. Preferred brominated compounds include 1,2-dibromo-1,2-diphenylethene (DBDE) (FIG. 3), 1,2,3,4-tetrabromo-1,4-diphenylbutane (TBDB) (FIG. 4), and 1,2,3,4,5,6,hexabromo-1,6-diphenylhexane HBDH) (FIG. 5). These types of brominated compounds readily coat the surface of the beads and provide the lubricant properties required by pre-expansion and molding operations. DBDE is commercially available, but TBDB and HBDH were synthesized by bromination of precursor olefins.

Is believed that the use of aromatic substituents on the brominated compound provides a number of advantages. It is believed that the aromatic group improves the ability to coat the compound onto the beads. Further, the aromatic group provides a lubricating property that is needed for the pre-expansion and molding operations. Thus, the use of the aromatic group eliminates the need for the addition of prior art lubricants, such as zinc stearates, that inhibit the function of the bromine atoms. The aromatic groups are also believed to lower the temperature for which the depolymerization of the expanded polystyrene beads occurs allowing the beads to break down faster and provide better metal fill of the mold. The aromatic groups are also believed to be responsible for reducing the viscosity of the liquid polystyrene products, thus providing for better metal fill of the mold. This reduces the occurrence of casting defects attributed to polystyrene degradation products becoming entrapped in the solidifying aluminum immediately following displacement of the polystyrene pattern by the advancing metal front.

Figure 6:
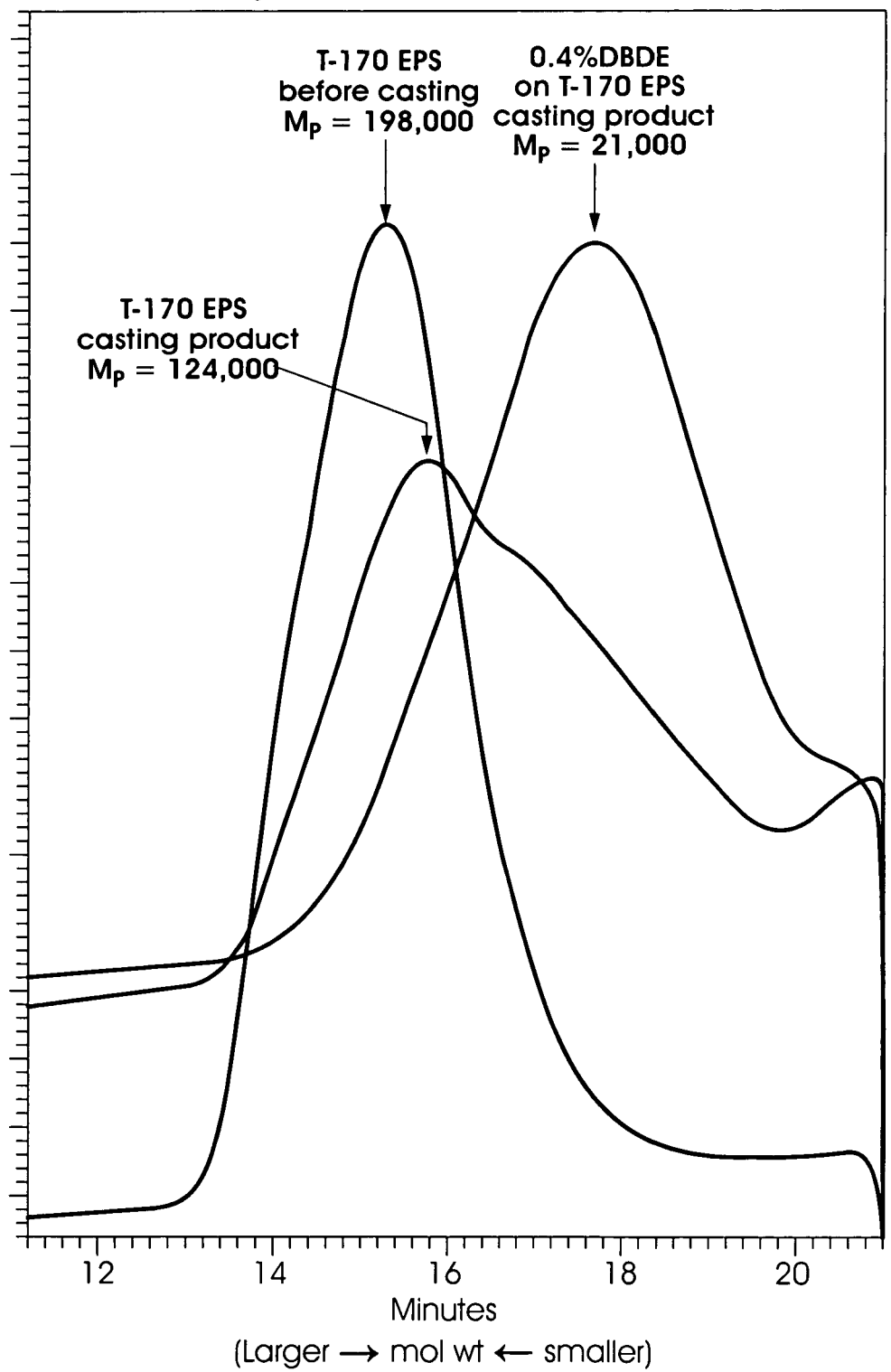
FIG. 6 is an illustration of the reduction in molecular weight of expanded polystyrene beads with a brominated compound topically applied thereto according to the present invention.

The effect of the brominated additives on the extent of the polystyrene depolymerization during metal casting was demonstrated using a laboratory scale model of lost foam casting, which allows recovery of polystyrene products after only a few seconds of molten metal exposure. The results of the experiment are provided in FIG. 6 which shows that without the additive, the peak molecular weight of polystyrene has decreased by less than half. But with the presence of 0.4 percent by total weight DBDE topically applied to the polystyrene beads, a reduction in peak molecular weight of nearly 90 percent was achieved.

Figure 7:
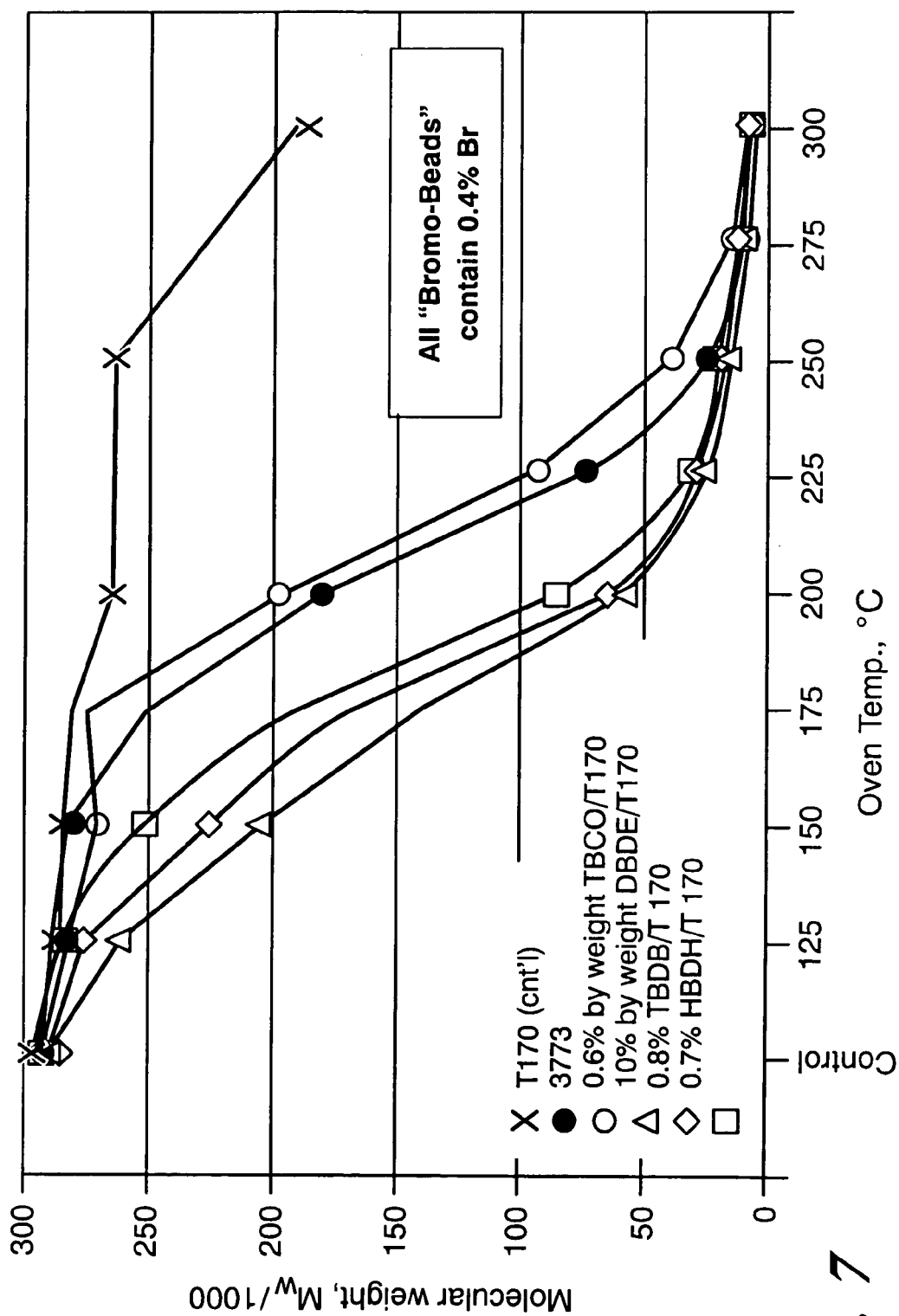
FIG. 7 is a graph illustrating the comparative polystyrene depolymerization activity of brominated expanded polystyrene additives illustrated by heating expanded polystyrene beads under an inert atmosphere in a laboratory oven.

FIG. 7 is a graph illustrating the results of comparative polystyrene depolymerization activity of brominated expanded polystyrene additives demonstrated by heating expanded polystyrene beads under an inert atmosphere in a laboratory oven. The resulting decrease in mass average molecular weight was measured by gel permeation chromatography. Current production beads without bromocompound additives (type T170) do not exhibit significant reduction in molecular weight at temperatures greater than 300° Celsius. The commercially available expanded polystyrene beads from StyroChem (designated as 3773) contains 0.6 percent by weight TBCO impregnated within the polymer matrix of the beads. The addition of TBCO as a powder to the surface of the T170 beads is shown to be nearly equivalent in depolymerization activity to the 3773 beads. The expanded polystyrene beads with the three brominated compounds (DBDE, TBDB and HBDH) topically applied thereto according to the present invention exhibited slightly different temperature dependent profiles, but produced equivalent decreases in molecular weight at temperatures that are 30–50° Celsius lower than required for TBCO. Thus, these preferred bromocompound additives topically applied to the polystyrene beads begin the depolymerization of the polystyrene beads at a much lower temperature and sooner than the prior art 3773 polystyrene beads.

The invention claimed is:

1. A process comprising:
    topically applying a finely divided powder onto a plurality of polystyrene beads, the finely divided powder comprising brominated compounds including a brominated alkane having at least two substituent aromatic groups;
    pre-expanding the polystyrene beads with the topically applied brominated compounds and forming a molded pattern from the pre-expanded polystyrene beads;
    forming a lost foam casting mold with the molded pattern; and
    pouring molten metal into the lost foam casting mold and onto the molded pattern to depolymerize the polystyrene beads with the topically applied brominated compounds.

2. A process as set forth in claim 1 wherein one of the substituent aromatic groups comprises a phenyl group.

3. A process as set forth in claim 2 wherein each of the two substituent aromatic groups comprises a phenyl group.

4. A process as set forth in claim 1 wherein the brominated compounds include three substituent aromatic groups.

5. A process as set forth in claim 4 wherein each of the three substituent aromatic groups comprises a phenyl group.

6. A process as set forth in claim 1 wherein each of the brominated compounds comprises at least two bromine substituents.

7. A process as set forth in claim 1 wherein each of the brominated compounds comprises at least four bromine substituents.

8. A process as set forth in claim 1 wherein the brominated compounds are topically applied to the polystyrene beads in an amount ranging from 0.1–5 weight percent.

9. A process as set forth in claim 1 wherein the brominated compounds are topically applied to the polystyrene beads in an amount ranging from 0.1–2 weight percent.

10. A process as set forth in claim 1 wherein the brominated compounds comprise dibromodiphenylethane.

11. A process as set forth in claim 1 wherein the brominated compounds comprise 1,2-dibromo-1,2-diphenylethane.

12. A process as set forth in claim 1 wherein the brominated compounds comprise tetrabromodiphenylbutane.

13. A process as set forth in claim 1 wherein the brominated compounds comprise 1,2,3,4-tetrabromo-1,2-diphenylbutane.

14. A process as set forth in claim 1 wherein the brominated compounds comprise hexabromodiphenylhexane.

15. A process as set forth in claim 1 wherein the brominated compounds comprise 1,2,3,4,5,6-hexabromo-1,2-diphenylhexane.

* * * * *